May 29, 1951 R. A. VANDERLIPPE 2,554,847

TELEGRAPH MARK-HOLD CIRCUIT

Filed March 23, 1948 2 Sheets-Sheet 1

INVENTOR
R. A. VANDERLIPPE
BY
Earl C. Laughlin
ATTORNEY

May 29, 1951 R. A. VANDERLIPPE 2,554,847

TELEGRAPH MARK-HOLD CIRCUIT

Filed March 23, 1948 2 Sheets-Sheet 2

INVENTOR
R. A. VANDERLIPPE
BY Earl C. Laughlin
ATTORNEY

Patented May 29, 1951 2,554,847

UNITED STATES PATENT OFFICE 2,554,847

TELEGRAPH MARK-HOLD CIRCUIT

Richard A. Vanderlippe, Bloomfield, N. J., assignor to Bell Telephone Laboratories, Incorporated, New York, N. Y., a corporation of New York Application March 23, 1948, Serial No. 16,453

6 Claims. (Cl. 178—88)

The present invention relates to carrier or radio telegraphy and especially to the maintenance of satisfactory or stable conditions at the receiver during pauses in the transmission when no carrier wave is being transmitted.

A carrier telegraph receiver must recognize one input receiving condition as a mark signal and another input receiving condition as a space signal, whether the system be of the single-carrier frequency type or the two-frequency type. During idle periods when the carrier is cut off corresponding to a no-message condition, it is desirable to have the receiver held positively in one of its two conditions throughout the idle period. Specifically it is desirable to have the receiver held to its mark position. If the receiver were not positively held in one position during idle periods, it would be subject to false operation by incoming noise. In the case of a printing telegraph receiver the receipt of noise under these conditions might cause the printing of false characters, in any case the receiving relay or indicator or other signal reproducing device in the receiver would be falsely actuated. If the receiver were positively held in the spacing condition, a receiver of the start-stop variety would "run open," causing undue audible noise and wear on the receiving mechanism. Furthermore, the receiver would not necessarily be in condition to start in synchronism with the received signals when the idle period is terminated.

It is an object of the present invention to hold a telegraph receiver continuously in one of its signal receiving conditions, specifically in its mark condition, during idle or no-message periods when no carrier is being received.

A more specific object is to supply to the receiver an artificial or locally produced "mark" to hold the receiver in marking condition during idle or no-message periods.

These and the various related objects and features of the invention will appear more fully from the following detailed description when read in connection with the accompanying drawings, in which.

Figure 1:
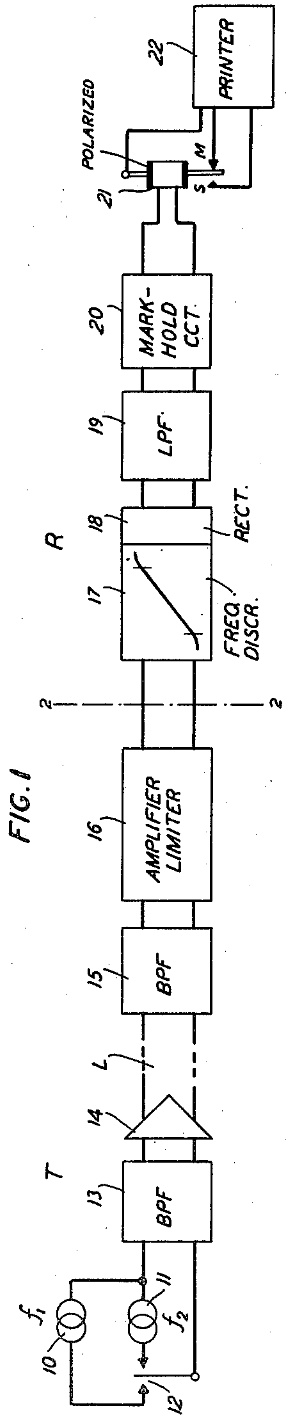
Fig. 1 is a block schematic diagram of a two-tone or two-frequency carrier telegraph system incorporating a "mark-hold" circuit according to the invention.

Referring to Fig. 1, the line L which may be a wire line, or a radio link including a suitable radio transmitter and radio receiver, connects the carrier telegraph transmitter terminal T with the carrier telegraph receiving terminal R.

Figure 2:
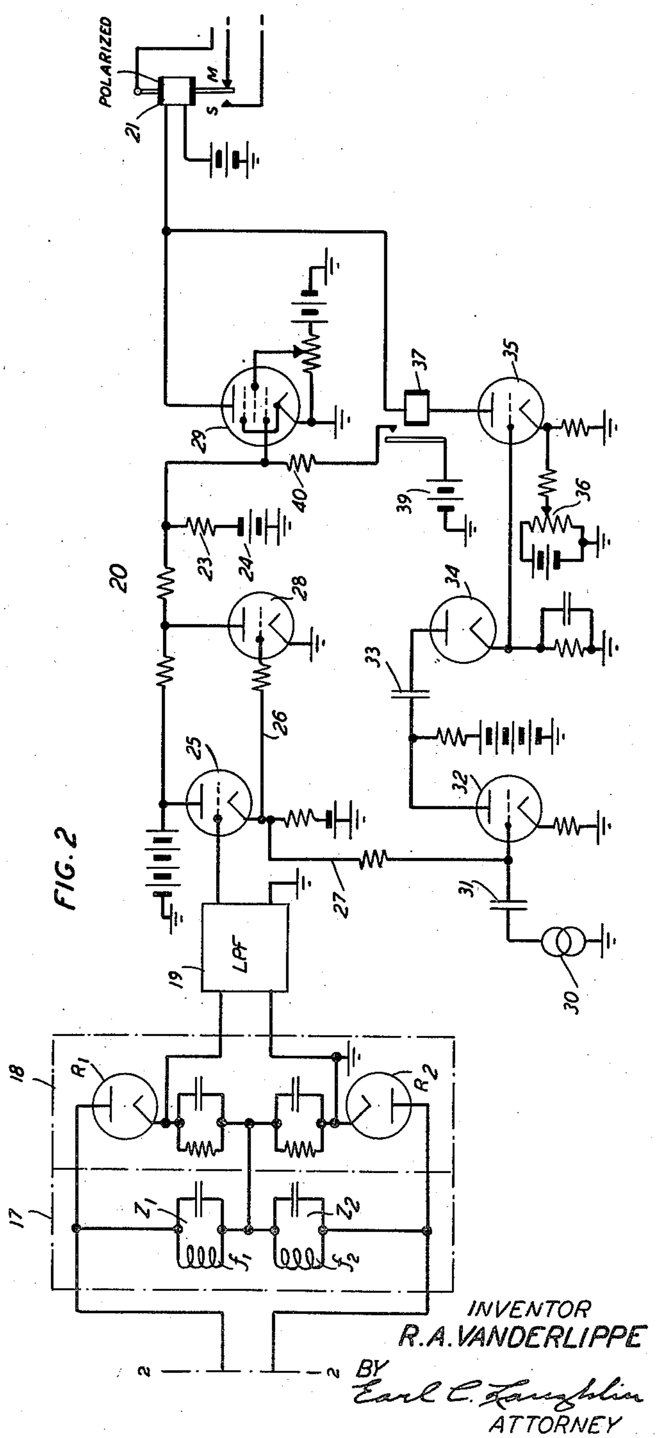
Fig. 2 shows in detail the circuit, in schematic form, of the receiving part of the system of Fig. 1 to the right of the line 2—2.

The system shown in Figs. 1 and 2 employs a carrier wave of one frequency, $f_1$, for producing mark signals and a carrier wave of a different frequency, $f_2$, for producing space signals. Two oscillators or other wave generators are shown at 10 and 11 for producing waves of the respective frequencies $f_1$ and $f_2$, and a key or relay tongue 12 is shown for connecting these generators one at a time to the input of the band-pass filter 13 which in turn feeds the waves through terminal amplifier 14 to the input end of the transmission link L. Filter 13 has a wide enough pass band to include both frequencies $f_1$ and $f_2$. This transmitting arrangement is purely illustrative and may be of standard or well-known type. It could, if preferred, use a single oscillator with two tuning circuit branches controlled by key 12, or it could vary in other respects.

The receiver is shown as including as known or standard parts: band-pass filter 15, amplifier limiter 16, frequency discriminator 17, rectifier 18, low pass filter 19, and receiving relay 21 for actuating printer 22; and the improvement provided in accordance with this invention, comprising the mark-hold circuit indicated by the block 20.

The filter 15 is similar to filter 13 and selects frequencies $f_1$ and $f_2$ and applies them to amplifier limiter 16 which eliminates amplitude variations including impulsive noise disturbances of amplitudes in excess of the carrier wave amplitude. The discriminator 17 and rectifier 18, described below, produce output pulses of opposite polarity in response to the two different frequencies $f_1$ and $f_2$. Low pass filter 19 serves to eliminate certain noise components that may be present at its input. As in the usual receiver, these output pulses cause operation of relay 21 to mark or space depending upon which frequency $f_1$ or $f_2$ produced the respective pulse, but the action in this case is carried out in quite a different manner from known practice in order to produce a mark-hold condition in accordance with this invention, as will be described in connection with Fig. 2.

Referring to Fig. 2, the discriminator 17 includes the tuned impedances $Z_1$ and $Z_2$ and has an impedance frequency characteristic such as to produce across diode elements $R_1$ and $R_2$ of the rectifier 18 markedly different amplitudes at the two frequencies $f_1$ and $f_2$ for the same input amplitude at these frequencies. Diode elements $R_1$ and $R_2$ are so connected as to produce at the input of low pass filter 19 a direct current pulse of one polarity in response to an input wave of frequency $f_1$ and a direct current pulse of opposite polarity in response to an input wave of frequency $f_2$.

These positive and negative signals after passing through filter 19 are applied to the grid of a tube 25 which is connected as a cathode follower and also has negative battery connected to its cathode so that the voltage at the cathode follows both the positive and the negative signal voltages appearing at the output of filter 19. The output of filter 19, and hence the cathode voltage of tube 25, are approximately zero-to-ground when no signal is being received. The output connection from this tube divides, branch 26 being part of the signal transmission path to the grid of tube 28, and branch 27 being part of the mark-hold path.

In the signal transmission path the signals are repeated through tubes 28 and 29. The plate circuit of tube 28 is coupled to the grid of tube 29 through a potentiometer 23 with negative battery 24 to cause the signal voltages on the grid of tube 29 to swing about zero-to-ground potential. The screen voltage of tube 29 is adjusted to the proper point to cause relay 21 in the plate circuit of tube 29 to pull up its armature in response to a mark signal but to release to spacing position when the mark signal ceases.

In the mark-hold branch, the changes of voltage at the cathode of tube 25 are applied to the grid of tube 32 through a resistor. These voltages are sufficiently high so that during signaling, tube 32 is either cut off by negative grid voltage or at plate saturation due to positive grid voltage. In either of these conditions, tube 32 is rendered incapable of transmitting the small voltage variations applied to its grid. For this reason the wave generated by oscillator 30 and continuously applied through capacitor 31 to the grid of tube 32 is not transmitted through to the plate circuit of tube 32 during normal signaling when marks and spaces are being received. Therefore, during normal signaling periods substantially no alternating voltage of the frequency of source 30 will be applied to rectifier 34, and the grid of the following tube 35 is approximately at zero-to-ground potential. Under these conditions tube 35 is cut off since its cathode is held at positive potential due to its connection to positive battery through bias potentiometer 36. Relay 37 in the output circuit of tube 35 under these conditions will receive no energizing current and will remain unoperated.

When transmission ceases and no carrier is being received over the transmission line or link, the cathode of tube 25 is, as already stated, approximately at ground potential and this allows the tube 32 to transmit the oscillations generated at 30 since its grid bias voltage is within the transmission range. These oscillations are amplified in tube 32 and applied through condenser 33 to the rectifier 34 where they are rectified and caused to apply positive bias to the grid of tube 35 sufficient to overcome the effects of the bias voltage derived from potentiometer 36 and to allow this tube to transmit current through the windings of relays 37 and 21 in series. Both relays operate, relay 21 going to its mark condition, unless it is already in its mark condition from the last received signal, in which case it is held in marking condition. Relay 37 in operating applies positive voltage from battery 39 through resistor 40 to the control grid of tube 29 to augment the current that is holding relay 21 operated.

The time constant of the rectifier circuit, including tube 34 and its cathode-ground resistor-capacitor combination and coupling condenser 33, may be adjusted with respect to the prevalent type of noise to secure best operation. Also the relay 37 may be given such time constant as best suits existing conditions.

As soon as signaling is resumed, tube 32 is again rendered incapable of repeating waves from source 30 through to rectifier 34, tube 35 is thrown beyond cut-off and the holding current through relays 21 and 37 is interrupted allowing relay 37 to release and relay 21 to respond to the received signals.

Figure 3:
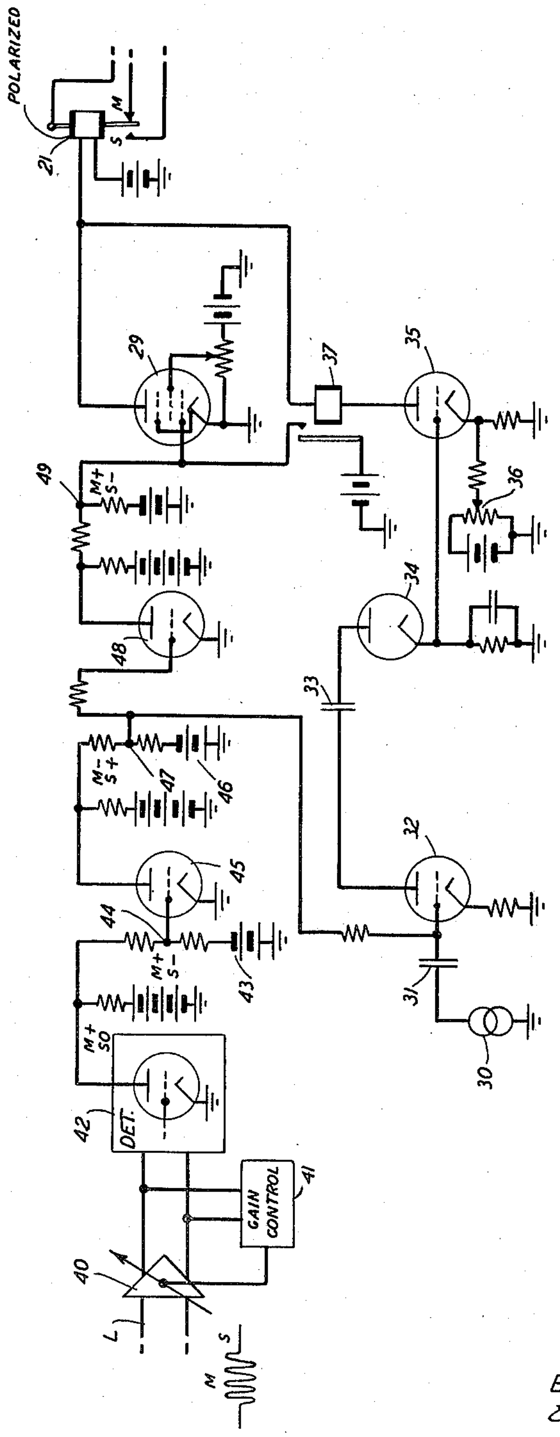
Fig. 3 is a schematic diagram of the receiving part of a single-frequency carrier telegraph system incorporating a mark-hold circuit according to this invention.

The invention will now be described as applied to a single-frequency system as illustrated in Fig. 3. The line current on line L consisting of on-and-off carrier current, representing marks and spaces, is first applied to the input of variable gain amplifier 40 which operates as a level compensator. Gain control 41 includes the usual filtering, rectifying, and time-constant elements for developing the proper control bias for the grid of the tube 40 to compensate variations in received signal level. This is followed by the usual detecting circuit 42. It is assumed that this circuit contains the proper number of stages to make the signal appear at point 44 as a positive voltage for a mark and a negative voltage for a space. For this condition to occur it is necessary that the negative battery 43 be used with the potentiometer resistances to which point 44 is tapped. The output of amplifier 45 has a similarly derived point 47 by the aid of negative source 46, the voltage at point 47 being negative for marks and positive for spaces. In like manner the grid of final tube 29 is thrown positive for marks and negative for spaces, because of the phase reversal in tube 48.

The mark-hold circuit, consisting of elements 30 to 37, is essentially the same as in Fig. 2 and operates in similar manner. The voltage conditions at point 47 are, however, quite different from those existing in the case of Fig. 2, and are roughly as indicated for illustration in Fig. 4.

Figure 4:
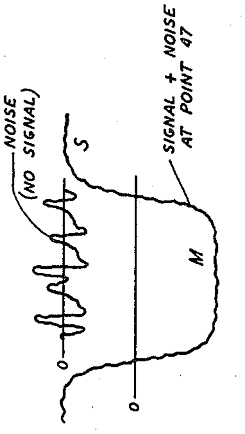
Fig. 4 shows graphs to be referred to in the description of Fig. 3.

On account of the action of the level compensator 40, 41, the receiver gain increases under a zero-carrier condition of sufficient duration, and the noise currents are amplified in proportion. Fig. 4 shows this action at least in a qualitative way. During signaling the noise appears superposed on the mark and space signals as relatively small variations, as indicated. The small graph labeled "Noise (No Signal)" shows conditions after an interruption of the carrier wave sufficiently long for the gain control to have stepped the gain of the receiver up to its steady value for this condition. The noise is illustrated, therefore, as having a much larger amplitude than in the normal signaling case. The noise is still smaller, however, than the marking signal.

During normal signaling, as in the case of Fig. 2, the voltage of the grid of tube 32 swings so far positive and negative as to prevent this tube from transmitting waves from source 30 through to the rectifier 34 in significant amount. A prolonged interruption of the carrier, however, allows tube 32 to amplify the waves from source 30 and these are rectified at 34 and cause operation of relays 37 and 21 as described in connection with Fig. 2. This is true even though the gain control operates to increase the receiver gain in the manner indicated in Fig. 4. For, even with relatively high peaks of noise, the noise waves are not systematic in form and the time constants of the rectifier 34 and associated elements can be set to hold over the peak periods. Tube 32 then transmits sufficient current during the lower noise periods to permit operation of the mark-hold circuit.

The invention is not to be construed as limited to the specific circuits disclosed nor to the magnitudes suggested, since these are for illustrative purposes, the scope of the invention being defined in the claims.

What is claimed is:

1. In a carrier telegraph system employing carrier waves for transmitting mark and space signals representing a telegraph message, a receiver including means for detecting the mark and space signals from the incoming carrier waves, signal reproducing means having a mark operated condition and a space operated condition, means to apply a portion of the signal energy in the output of said detecting means to said reproducing means to operate it to the mark condition in response to each received mark signal and to the spacing condition in response to each received space signal and means for protecting said reproducing means against false operation by interference or noise during a prolonged interruption of the carrier waves corresponding to a no-message period comprising means for positively holding said reproducing means in one of its two said operated conditions and means controlled by another portion of the signal energy in the output of said detecting means for disabling said holding means during each message transmitting period.

2. In a carrier telegraph system utilizing on-and-off carrier current respectively representing marks and spaces for transmitting a telegraph message to a receiving point, a receiver at said receiving point including detecting means for translating the incoming wave into mark and space signal pulses and switching means operatively responsive to each mark signal pulse for producing a mark indication and to each space signal pulse for producing a space indication, and means associated with said receiver responsive to an interruption of the carrier wave for a period long in comparison with the longest signal space for causing said switching means to produce a mark indication continuously during such interruption period.

3. In a carrier telegraph system, a receiver including a switching device operating in response to carrier signals representing a telegraph message received over said system to reproduce said message, and subject to false operation by noise during a no-message interval and means to prevent said false operation comprising an auxiliary source of wave energy at said receiver and a transmission device connected between said source and said receiver operating in response to a cessation in the received carrier signals corresponding to a no-message interval to allow transmission of wave energy from said source to said switching device to hold it in a given operated condition during such no-mesage interval, said transmission device being held disabled in response to the incoming carrier signals during message transmitting intervals so as to prevent operation of said switching device by wave energy from said source.

4. In a carrier telegraph receiving system, means for translating received carrier telegraph waves into mark-space signals, a relay responding to said mark-space signals, an auxiliary source of actuating current for urging said relay to its mark operated position and control means connected between said source and said relay, said control means being held in an inoperative condition by mark-space signals during telegraph mesage transmitting periods so as to prevent application of current from said auxiliary source to said relay during such periods, and being rendered operative in response to a prolonged interruption in receipt of mark-space signals to allow transmission of actuating current from said auxiliary source to hold said relay continuously in its mark position as long as said interruption continues.

5. In a carrier telegraph system employing alternate transmission of carrier waves of two different frequencies for the mark and space signals respectively, of a telegraph message, a receiver including detecting means for translating said waves of different frequency into mark and space signal pulses, respectively, and telegraph message reproducing means including relay means operative to a mark position in response to each of said mark signal pulses and to a space position in response to each of said space signal pulses, and means for protecting said relay means against false operation by interfering or noise currents during no-message periods when no carrier waves of either of said two frequencies are being received comprising an auxiliary energy source at said receiver for actuating said relay means to a marking condition, means including an electron discharge device coupling said auxiliary source to said relay means, said electron discharge device being normally operative so as to transmit actuating energy from said source to said relay means and other means responsive to a portion of the signal energy appearing in the output of said detecting means during message transmitting intervals when carrier waves of either of said two frequencies are applied to the input thereof, to disable said electron discharge device and thereby prevent actuation of said relay means by energy from said source during such intervals.

6. In a two-tone carrier telegraph receiver, a receiving telegraph relay, means to translate received carrier wave trains of one frequency into mark signals to actuate said relay to mark position, means to translate received carrier wave trains of the other frequency into space signals to actuate said relay to space condition, a grid-controlled space discharge tube at said receiver, a source of wave energy coupled to a grid thereof, said tube also having a grid connected to said receiver to receive said mark and space signals in sufficient amplitude during normal signaling to shift the grid potential into the saturated or cut-off regions of the grid-anode characteristic of said tube whereby said tube is rendered ineffective to repeat waves from said source into the output circuit of said tube, said tube in the absence of received mark or space signals being conditioned to repeat said waves into its output, and an auxiliary energizing circuit for said relay extending from the output side of said tube for causing said waves when repeated through said tube into the output circuit thereof to actuate said relay to its mark position.

RICHARD A. VANDERLIPPE.

REFERENCES CITED

The following references are of record in the file of this patent:

UNITED STATES PATENTS

| Number | Name | Date |
|---|---|---|
| 2,216,820 | Lewis | Oct. 8, 1940 |
| 2,230,681 | Frischknecht | Feb. 4, 1941 |

FOREIGN PATENTS

| Number | Country | Date |
|---|---|---|
| 555,020 | Great Britain | July 29, 1943 |